(12) United States Patent
Truluck et al.

(10) Patent No.: US 6,353,447 B1
(45) Date of Patent: Mar. 5, 2002

(54) STUDY PLANNER SYSTEM AND METHOD

(75) Inventors: Mark A. Truluck, Seattle; Renée Louise April, Bellevue; Kenneth G. Zick, Seattle; John V. Garibaldi, Seattle; Kimberly J. Rush, Seattle, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/237,454

(22) Filed: Jan. 26, 1999

(51) Int. Cl.[7] .................................................. G06F 3/00
(52) U.S. Cl. ..................... 345/733; 345/963; 345/705; 434/323; 434/350
(58) Field of Search .................... 345/326, 329, 345/331, 357, 336, 338, 733, 751, 854, 705, 708, 963; 434/322, 323, 336, 335, 350, 432; 705/8, 9

(56) References Cited

U.S. PATENT DOCUMENTS

| | | | |
|---|---|---|---|
| 5,211,563 A | | 5/1993 | Haga et al. |
| 5,601,432 A | * | 2/1997 | Bergman ..................... 434/118 |
| 5,778,346 A | * | 7/1998 | Frid-Nielsen et al. .......... 705/9 |
| 5,967,793 A | * | 10/1999 | Ho et al. ..................... 434/362 |
| 6,012,037 A | * | 1/2000 | Yoshikawa ..................... 705/8 |
| 6,014,134 A | * | 1/2000 | Bell et al. .................... 345/329 |
| 6,047,260 A | * | 4/2000 | Levinson ....................... 705/9 |

FOREIGN PATENT DOCUMENTS

| | | |
|---|---|---|
| EP | 0 710 942 | 10/1995 |
| EP | 1 003 141 | 11/1999 |
| WO | WO 97/44767 | * 11/1997 |

OTHER PUBLICATIONS

Copy of International Search Report in Corresponding PCT Application No. PCT/US00/01408.

* cited by examiner

Primary Examiner—John Cabeca
Assistant Examiner—Kieu D. Vu
(74) Attorney, Agent, or Firm—Michalik & Wylie, PLLC

(57) ABSTRACT

A method and system for setting up and using a personal learning schedule and path through an instructional product. Using a wizard-style interface, a study plan is established for a user based on a session frequency, along with the date the user wishes to finish the instructional product or the amount of time that the user has available each session. Once the user has set up a study plan, each time that user logs in, the user is taken to that day's list of assigned activities on a personalized home page. From there, the user is able to check activity status for past and future lessons, and quickly navigate to a lesson. Users can set up their own personalized learning schedule based on their own study objectives. The method and system further allow the user to determine a skill level required to complete the activities, and further monitors the user's progress in successfully completing those activities.

29 Claims, 9 Drawing Sheets

STUDY PLANNER SYSTEM AND METHOD

TECHNICAL FIELD

The invention relates generally to computer systems, and more particularly to a method and system for scheduling and maintaining study goals for a user and for monitoring the user's progress with respect to those goals.

BACKGROUND OF THE INVENTION

Computers are being used on an ever-increasing basis to help users learn various skills. For example, users may use a computer to learn foreign languages, prepare for examinations, learn to play musical instruments and so on. As the computer serves as a tutor with essentially unlimited time and unending patience, the skill set learned by a user is essentially a function of the quality of the instructional software in combination with the time and effort put forth by the user.

In general, users of such instructional products are attempting to learn a skill set in a self-study environment, without the traditional classroom motivations of homework assignments, the desire to perform well in front of others, and the opportunity to communicate with others regarding the lessons learned. Many times, such users are often busy professionals who value their limited spare time and want to improve their skills in an efficient manner. Some study-related products have features that evaluate the user's progress in terms of percentage complete, or assess the user's work at any given time. However, no product has heretofore assisted the user in setting up, maintaining and monitoring study goals that are customized for the user based on the user's personal circumstances.

SUMMARY OF THE INVENTION

Briefly, the present invention provides a system and method for providing a personalized scheduled study plan for a user to learn content of a product. Input criteria is received from the user, such as identifying study session (days) in a week and the time per study session or a desired completion date. A study plan based on the user input criteria is calculated and stored for the user. For example, if the user inputs a desired completion date, the time per session is calculated and used to schedule learning activities, while if the user inputs a time per session, the desired completion date is calculated.

The study plan is accessed for the user each time the user logs in for a session, whereby the study plan is used to determine the activities for the session. The progress of the user may be monitored and displayed to the user, such as in the form of complete and incomplete activities. The user may navigate to activities from such a progress display, and may also set a completion level indicative of what skill level is required before an activity is considered complete.

Other advantages will become apparent from the following detailed description when taken in conjunction with the drawings, in which:

DETAILED DESCRIPTION OF THE INVENTION

Exemplary Operating Environment

Figure 1:
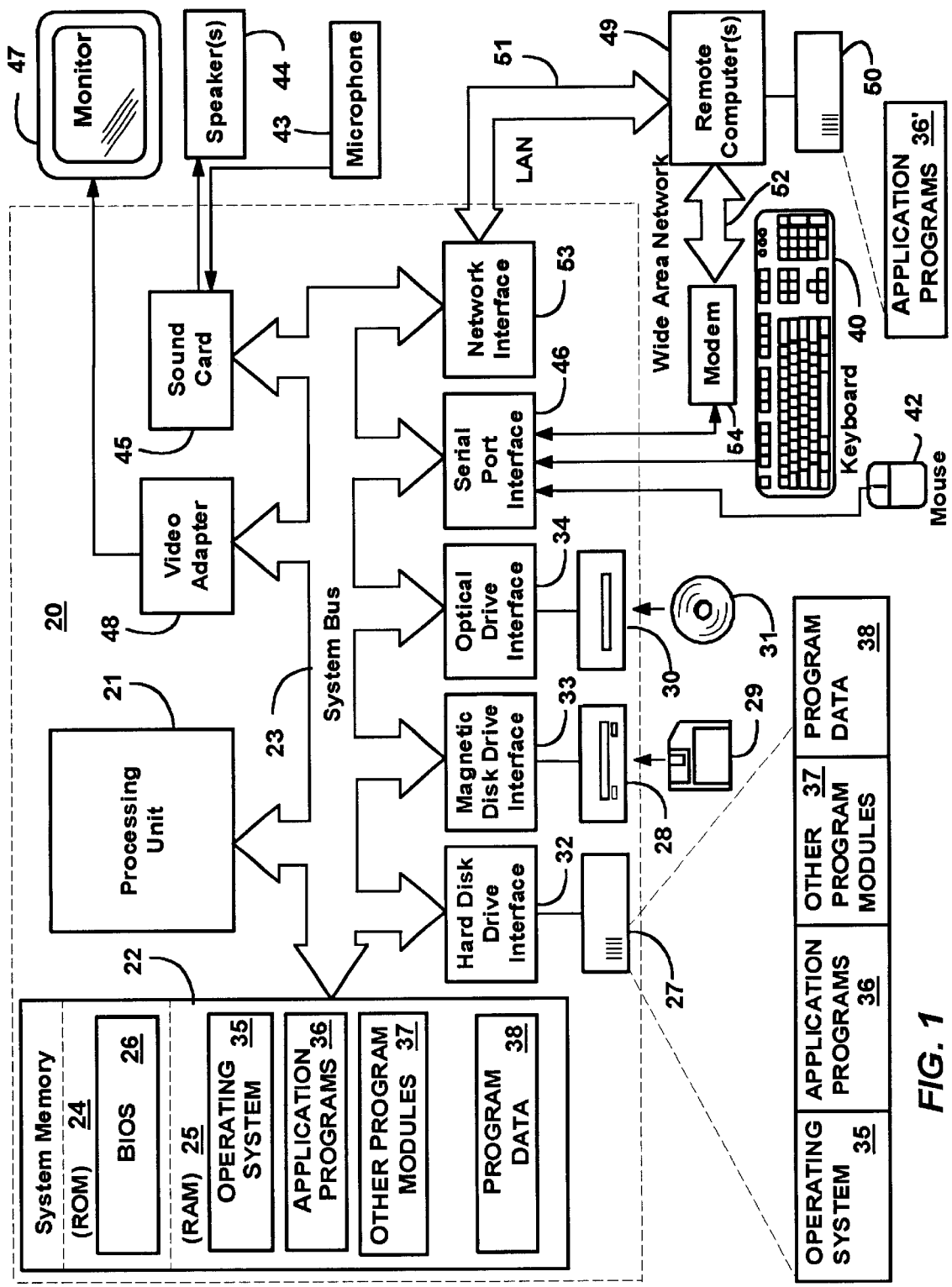
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMS) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Study Planner

In general, the present invention provides a method and system for developing a personalized, scheduled study plan for a user based on the user's selection of criteria, for implementing the study plan, and monitoring the user's progress with respect to the scheduled plan to provide feedback to the user based on the user's progress. While the present invention was originally implemented in a language teaching environment, it should be understood that the present invention is not limited to teaching a language, (e.g., a foreign language or one's first language), but instead has numerous applications throughout user computing directed to learning any set of skills in accordance with a schedule. Moreover, although the various components are shown and described herein as separate components because of certain benefits resulting from separated functionality, it can be readily appreciated that some or all of the components may be combined into more complex components, and/or separated even further into additional components.

Figure 2:
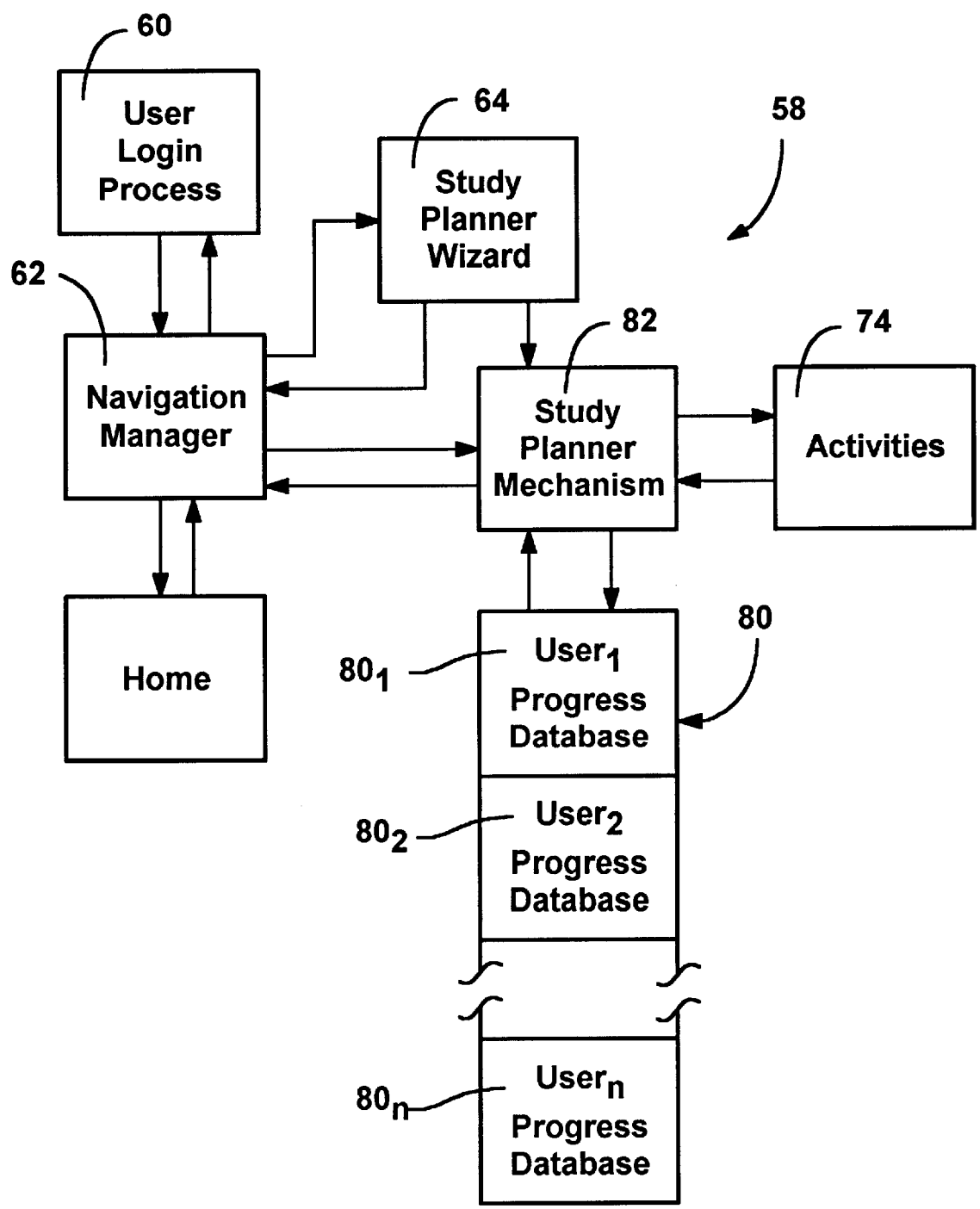
FIG. 2 is a block diagram representing general components for scheduling personalized study goals for users and for maintaining and evaluating the user's progress with respect to those goals, in accordance with aspects of the present invention.

FIG. 2 generally illustrates components for developing a personalized study plan based on user input criteria, and then implementing and monitoring that study plan as the user progresses through various lessons and other activities over the course of learning. Although not necessary to the present invention, the study planner system and method (generally designated 58) preferably handles multiple users, and thus a component thereof is a user login process 60 which provides a way for the study planner 58 to distinguish among different users, enabling each user to work with the product with personalized study plans.

As described in more detail below, the first time that a given user logs in, a navigation manager 62 automatically starts a study planner wizard 64 for that user. In general, the study planner wizard 64 is arranged to take user preference information as input, and develop a personalized study plan for the user based on that input. An initial wizard display screen 66 (FIG. 3) is provided to facilitate the user selection of preference information, which includes the day or days of the week the user wants to study, the hours per day the user wants to study, and/or the date by which the user wants to complete the product. More particularly, the user first chooses the day or days of the week on which to study via toggle checkboxes 68. Next, the user can either choose an amount of study time per day via mutually exclusive checkboxes (radio buttons) 70, or choose a plan completion date via a calendar 72.

In accordance with one aspect of the present invention, the wizard 64 calculates the hours needed per session if the user enters a valid completion date, or calculates a completion date if the user enters the number of hours per session. To this end, a total product time is determined based on a number of activities 74 in the product and the number of minutes per activity. Then, using the estimated total time and the two known user-entered variables (days per week and hours per day, or days per week and completion date), the unknown may be calculated via the following formula:

$$\text{Compl. Time} = \text{Total Time}/((\text{Days/Week})*(\text{Hours/Day}))$$

Figure 4:
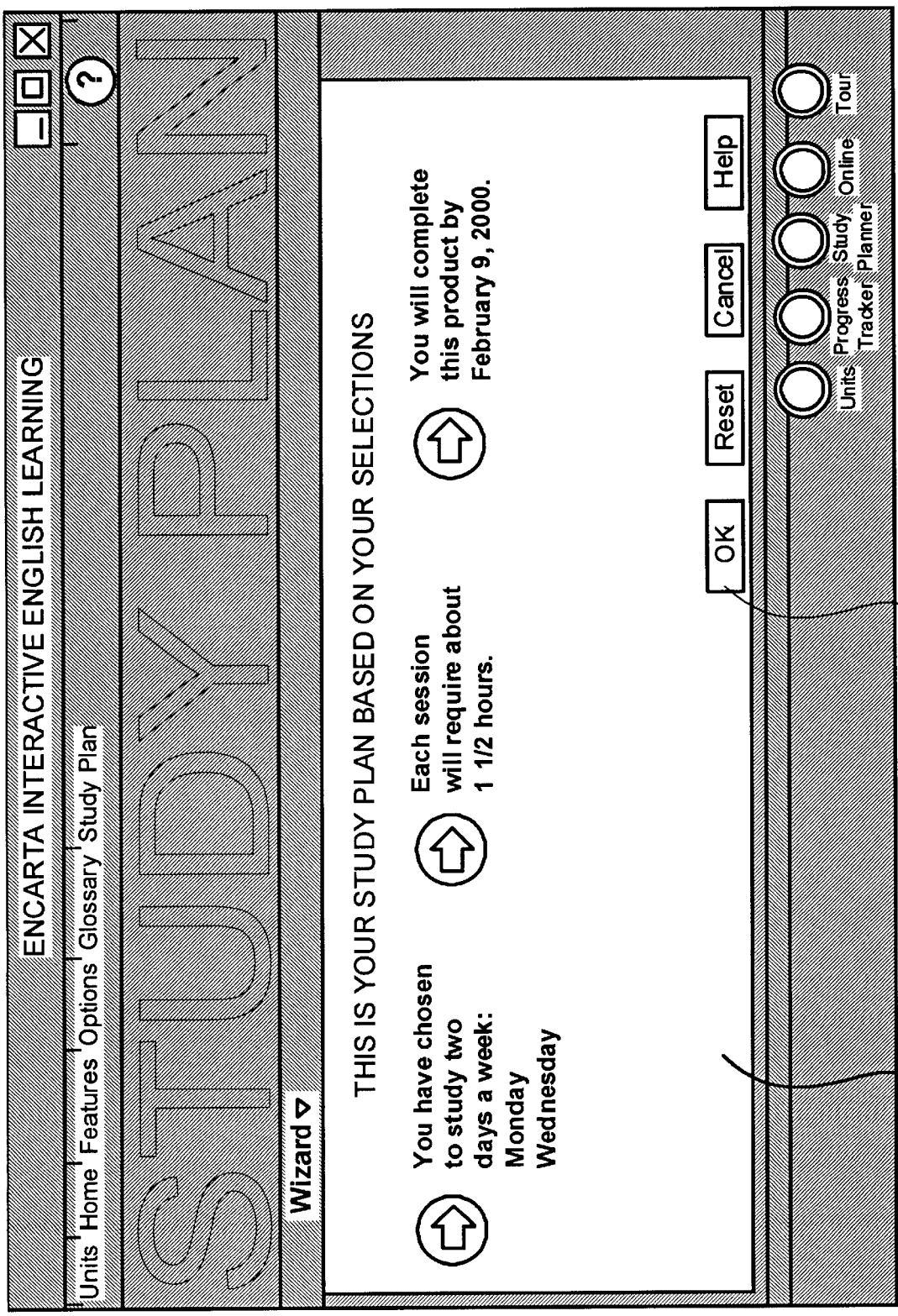
FIG. 4 is a representation of a display screen for showing a user a resultant personalized study plan based on the user-selected criteria, in accordance with an aspect of the present invention.

Note that if the user attempts to select a plan completion date that is less than or greater than is deemed reasonable, the user is informed that an invalid date has been selected. As can be readily appreciated, the wizard 64 may be arranged to handle other user input criteria, for example, a check box (not shown) instructing the wizard 64 to not include known holidays in its calculations. In any (valid) event, via a subsequent wizard display screen 76 (FIG. 4), the user is then informed of the selected study days, the selected study hours, and what the end date for the product will be. If the user (e.g., User$_2$) accepts the plan, e.g., by clicking an "OK" button 78, the plan is committed to a database for that user (e.g., the database 80$_2$ of FIG. 2 of a possibly larger database 80), and the user is then transitioned to a study planner mechanism 82. In general, to schedule the activities, the study planner mechanism 82 distributes the activities 74 over the scheduled study days, such as by a number of activities per session.

Figure 5:
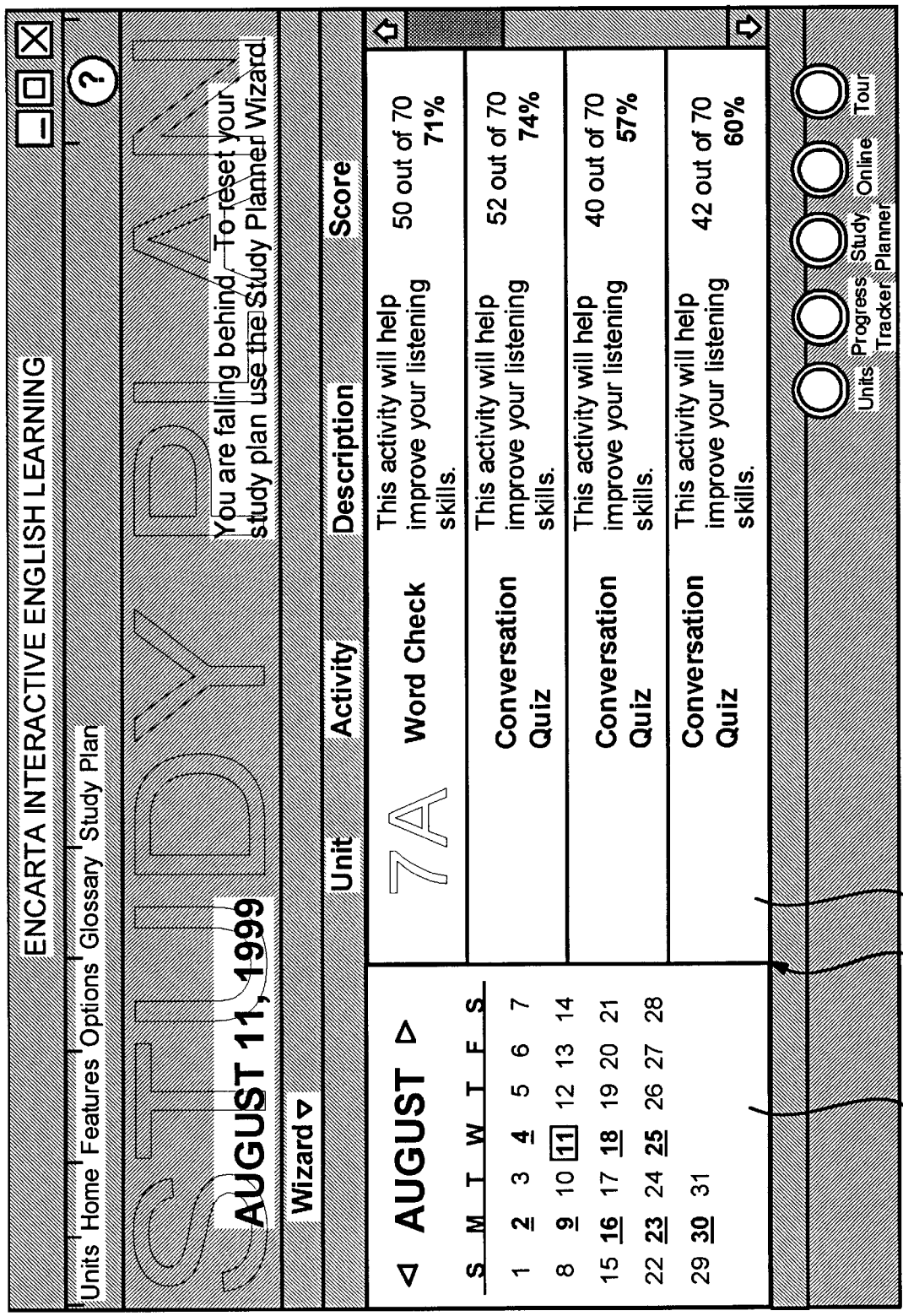
FIG. 5 is a representation of a display screen for showing a user's existing study plan.

Once a study plan is scheduled for a user, each time the user logs in, the login process 60 and navigation manager 62 will cause the user to receive a study planner screen 84 (FIG. 5). The information displayed preferably corresponds to the activities scheduled for the current date, but may alternatively be based on the user's state of progress in the subject being studied, as interpreted by the study planner mechanism 82, e.g., the activities shown may be dependent upon the last activity that was not completed. The study planner screen 84 will serve as the user's home screen. More particularly, once the user has set up a study plan, the user's product home page will be "bookmarked" with the study planner as the suggested entrance point for this user. In general, the activity bookmarked as the next activity for a user is defined by a sequential order, e.g., Unit 1, Topic 1*a*, activities 1–12, Topic 1*b*, activities 1–12, and so forth, advancing as activities are completed.

Figure 6:
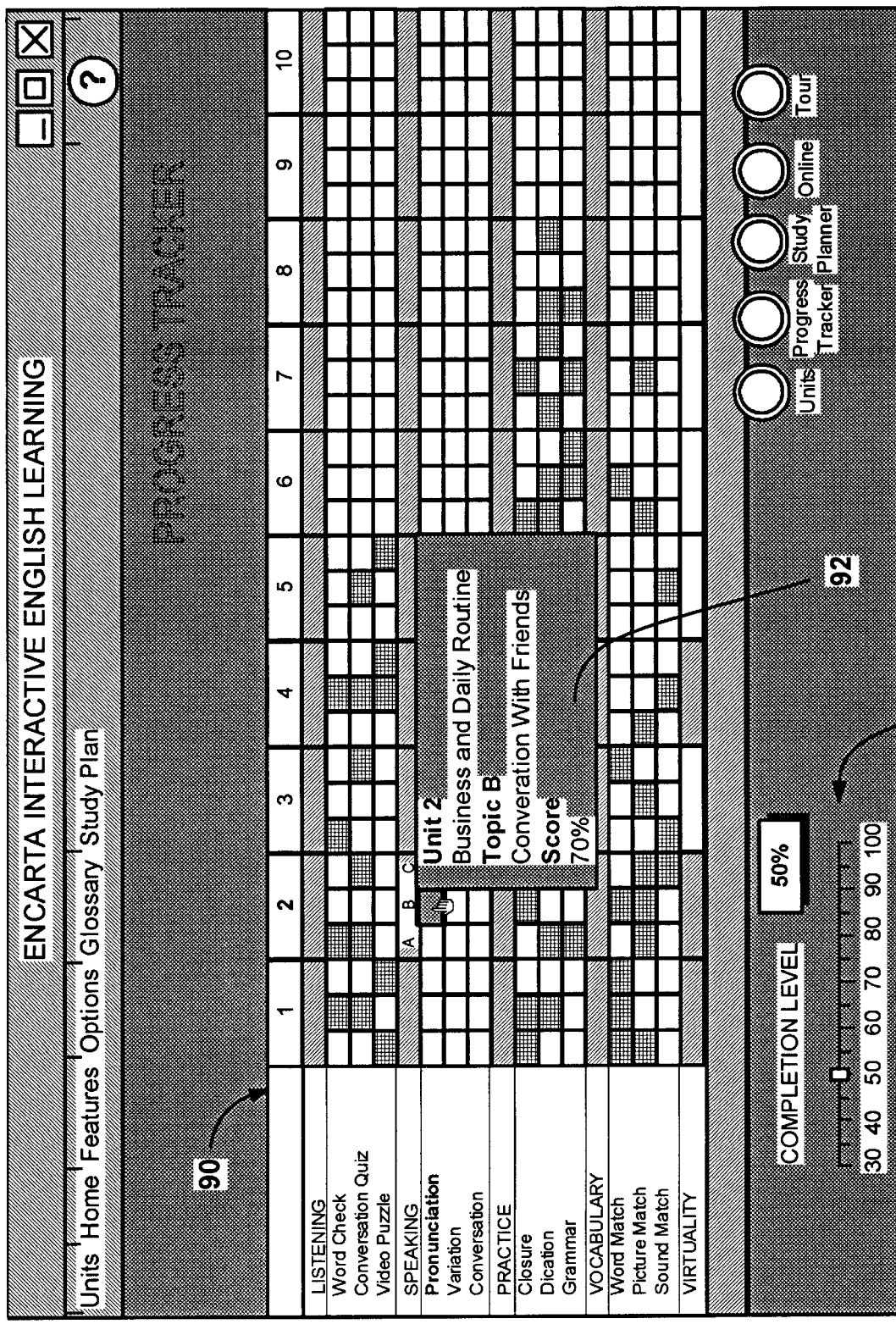
FIG. 6 is a representation of a display screen for showing a user's current progress through a set of activities in a study plan.

The user may also select a progress tracker screen 90 (FIG. 6) which displays the user's progress with respect to a larger set of activities, possibly all of the activities in the product. The progress tracker screen 90 provides a quick overview of what areas a user has and has not completed, i.e, as generally represented in FIG. 6, completed activities are displayed differently (e.g., shaded or a different color) from incomplete activities. Moreover, the user may move a cursor to a particular activity on the progress tracker screen 90 to get additional status information about that activity via a flyout box 92. The user may also navigate directly to any activity by clicking on the square representing that activity.

In accordance with another aspect of the present invention, the user may set a threshold percentage level (e.g., percentage correct) as to what is required for the user to have completed an activity. For example, activities such as vocabulary tests may keep score as to the user's comprehension of words, and a user may set the level so as to not be complete until the user has achieved a certain percentage score, such as at least fifty percent correct. To enable the user to enter a personalized completion level, an area 94 of the progress tracker screen 90 provides a mechanism such as a slider bar, shown herein as a percentage adjustment tool. In this manner, the level to which a user wants to master the instructional product may be personalized for each user of the product. Note that it is alternatively feasible to allow different completion level settings for various features of the product, e.g., a percentage correct for each activity, one for each type of activity, and so on. Moreover, note that instead of percentages, some other measuring metric may be used, e.g., letter grades.

In the event that the user changes the completion level, the various activities may change from complete to incomplete, and vice-versa, depending on the user's actual score. For example, if the user's original completion level was set at eighty percent, and then lowered to sixty percent, any scored previous activity is reevaluated at the changed level, whereby scores between sixty and eighty percent are changed to complete. Conversely, if the user raises the completion level, activities having scores that fail to achieve the increased level are considered incomplete, regardless of their previous status.

In accordance with another aspect of the present invention, the user's actual progress in completing activities is tracked against the pace that the user needs to achieve in order to complete the product by the completion date. If the user falls behind schedule, possibly by some threshold amount, a message is provided to the user informing the user of the "behind schedule" status. For example, a simple way to determine if the user is behind schedule is to determine (e.g., on a weekly basis) at which activity the user should be on a given date, and look back and see whether the user has completed all prior activities. An alternative way in which to determine progress is to compare an amount of incomplete activities (e.g., by number or summing total estimated time per activity) against the remaining schedule. By monitoring progress, the study planner mechanism 82 attempts to keep the user on the scheduled study plan. The user may, if desired, re-run the study planner wizard at any time to change the scheduled study plan.

Figure 7:
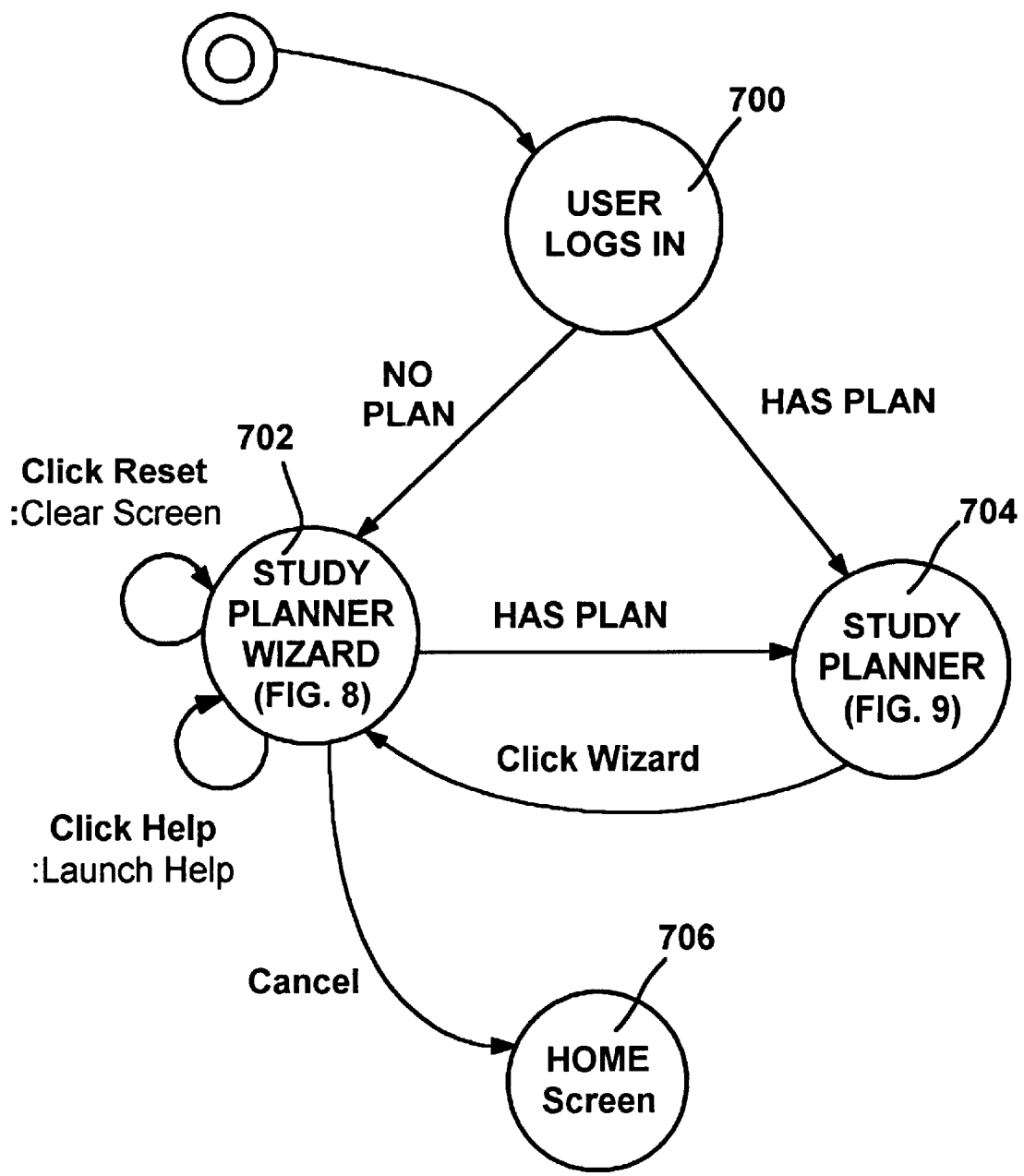
FIG. 7 is a state diagram showing possible actions and states on startup of the study planner in accordance with one aspect of the present invention.

Turning to an explanation of the operation of the present invention, FIG. 7 is a state diagram generally describing the actions that may be taken when a user logs in. As shown in FIG. 7 at state 700, if the user has no existing plan, the study planner wizard 64 is executed (as represented by state 702), where, for example, the user is shown the wizard's initial display screen 66 (FIG. 3) so as to facilitate entry of the personal study preference information. Via this state 702, the user may input information and have a plan developed therefor as described above,(e.g., via an "Enter" button 82, FIG. 3), and upon acceptance of the plan, (e.g., via an "OK" button 78, FIG. 4) transition to the study planner state 704. Note that via other buttons shown in FIG. 3 and as represented in FIG. 7 at state 702, the user may reset any selections, cancel the wizard 64 and return home (state 706), and/or click and launch help. As also represented in FIG. 7, the user reaches the study planner state 704 directly from the login state 700 when the user already has a plan therefor in the database 80.

Figure 3:
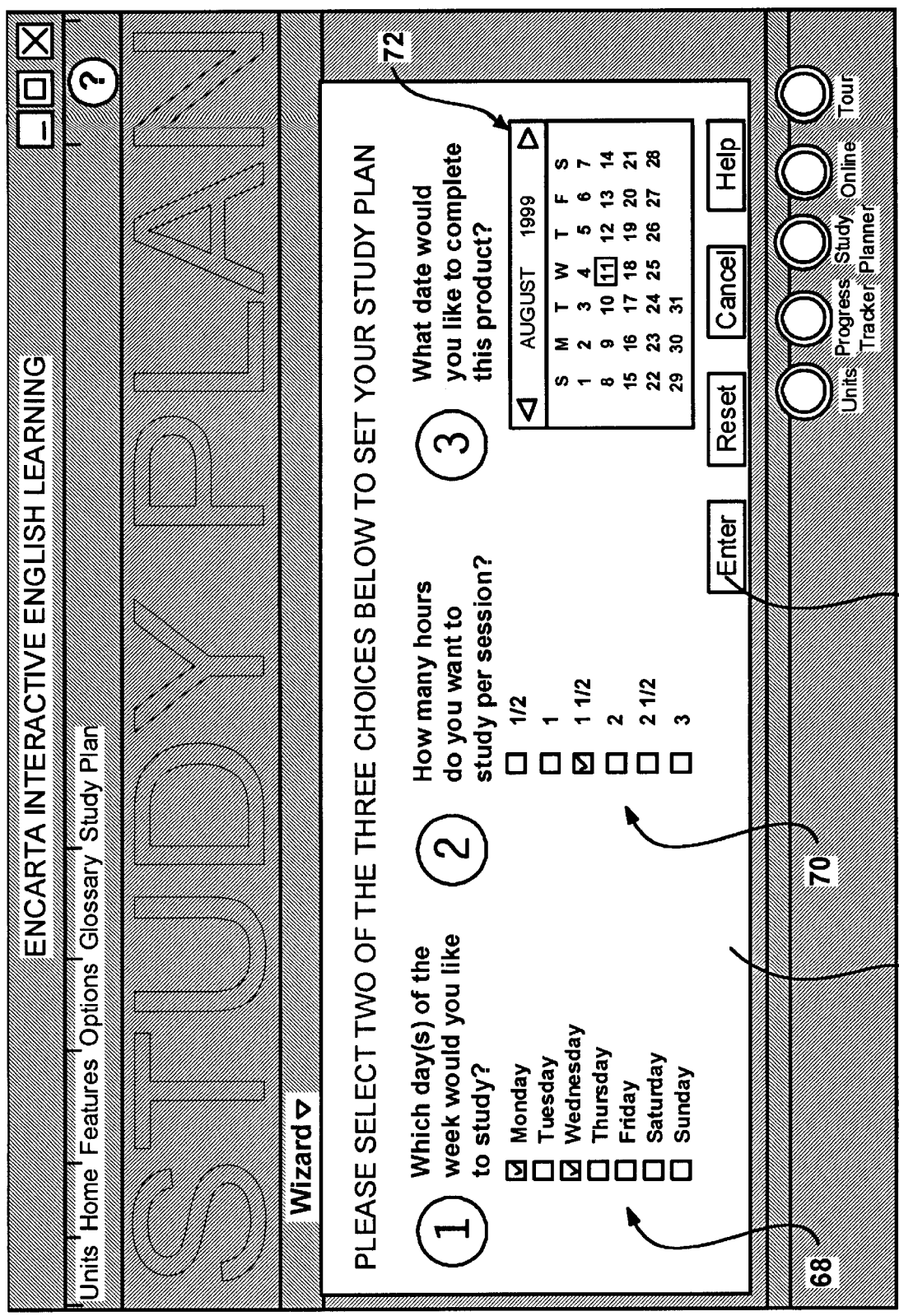
FIG. 3 is a representation of a display screen via which a user selectively enters criteria for developing a personalized study plan in accordance with an aspect of the present invention.
Figure 8:
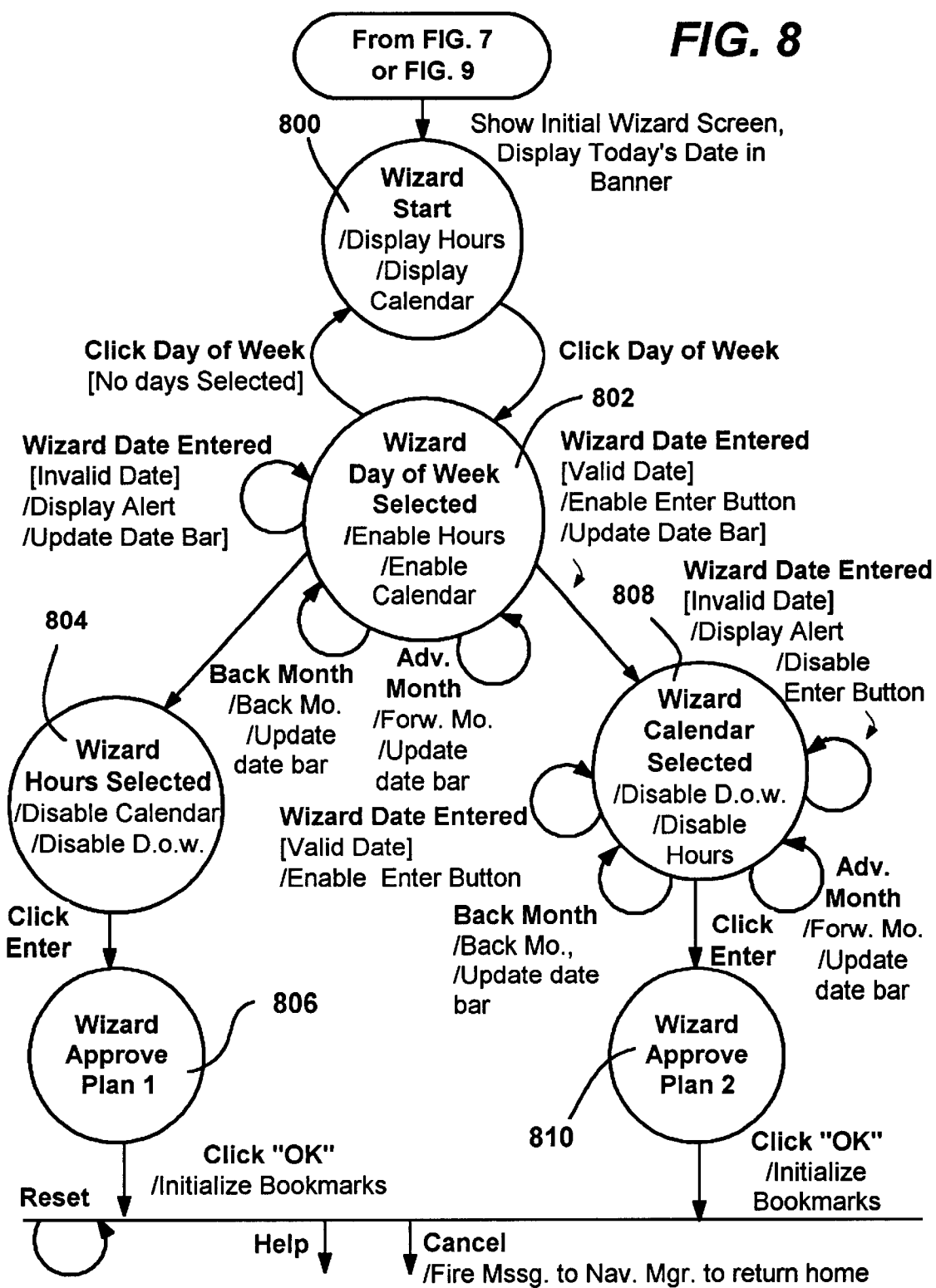
FIG. 8 is a state diagram showing possible actions and states when a study planner wizard is active to receive user-selected criteria for developing a study plan therefrom in accordance with one aspect of the present invention.

FIG. 8 generally shows the states of operation of the wizard 64, beginning at state 800 wherein the wizard 64 begins by putting up the display 66 for entering user preferences as generally shown in FIG. 3 (but with initially blank checkboxes). The current date, shown here as Aug. 11, 1999, will be displayed in the calendar 72 showing the corresponding current month. At this time, the hours per day input boxes 70 and calendar 72 are displayed but are disabled and may be shown as grayed-out, (although not shown as disabled in FIG. 3), forcing the user to enter at least one day of the week via the checkboxes 68. When the user clicks a day of the week, the wizard 64 transitions to the state 802 wherein the hours per day buttons 70 and calendar 72 are enabled for user input. In this state 802, the user may toggle the days of the week, select an hours per day setting (state 804), back up or advance the calendar 72, or enter a completion date via the calendar 72 (state 808). Note that if the user clicks off all days of the week, the wizard 64 returns to the state 800. At this time (and essentially any time in the wizard 64) the user may click Help (launch help), Reset (clear boxes and return to state 800) or Cancel (return to a home screen). The Enter button 82 may be selectively disabled (and displayed as grayed-out) until the user enters minimal criteria, including a day of the week and either a completion date or an hours per day setting.

If at state 802 the user selects an hours per day setting, the wizard 64 transitions to state 804 wherein the calendar 72 and the days of the week checkboxes 68 are disabled. If the user then clicks Enter, (now enabled), the wizard 64 transitions to a state 806 wherein the completion date is calculated and the subsequent wizard screen 76 (FIG. 4) is displayed to the user to await user approval of the scheduled plan.

If at state 802 the user enters a date, the wizard 64 checks for a valid date based on the user's criteria with respect to the current date and the total hours estimated for completion of the product. If the selected date is before the current date, or if the selected date results in too many hours per day being required to complete the product, (e.g., more than eight), the user is given an appropriate alert (e.g., message or other visual warning) and the wizard 64 remains at state 802. If a valid date is calculated, the Enter button 82 (FIG. 3) is enabled, the date bar is updated, and the wizard 64 transitions to state 808 wherein the days of the week checkboxes 68 and hours per day checkboxes 70 are disabled.

In the state 808, the user may work with the calendar to change the completion date, i.e., back up and advance the month, and/or enter a different completion date (valid or invalid). If the user then clicks the Enter button 82, (enabled when a valid date is selected, disabled on an invalid date), the wizard 64 transitions to a state 810 wherein the session length (hours per day) is calculated and the subsequent wizard screen 76 (FIG. 4) is displayed to the user to await user approval of the scheduled plan.

Figure 9:
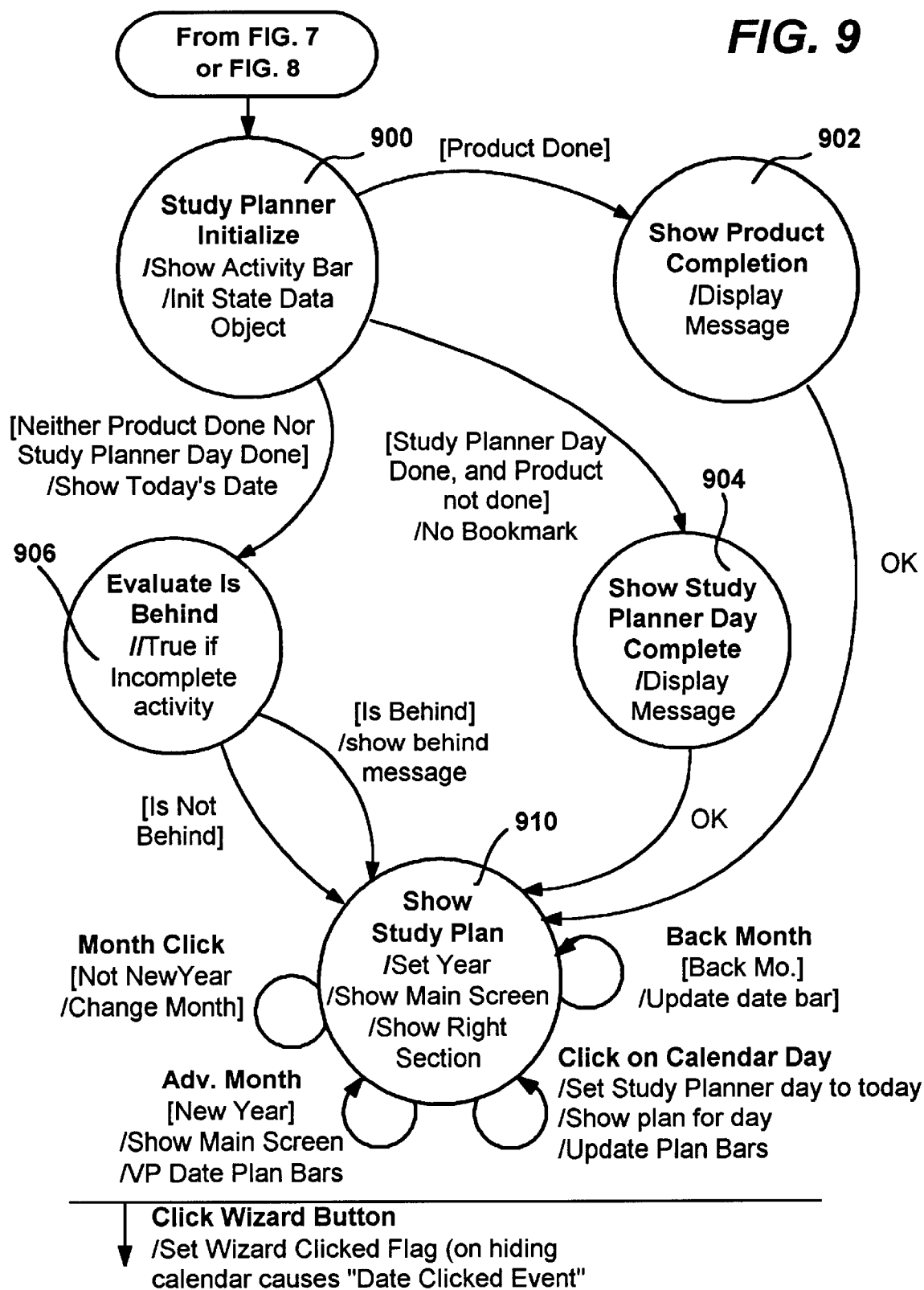
FIG. 9 is a state diagram showing the possible actions when a study plan is active and selected for a user in accordance with another aspect of the present invention.

Once the user approves the plan at state 806 or state 810 of the wizard 64, the user is transitioned to state 900 (FIG. 9) of the study planner 82. Note that the user may also be transitioned to state 900 from state 700 of the login process 60 if the user logging in already has a study plan. In any event, after initialization (state 900), the study planner tests if the product is done, i.e., determines whether there are no incomplete activities for that user to complete. In such an instance, state 900 transitions to state 902 where a product completion message is shown to the user. State 902 then continues to state 910 where the user's main study plan screen 84 (FIG. 5), including the right section 88, is shown to the user. As can be appreciated, allowing the user to remain in the product after completion gives the user the opportunity to practice a previously completed activity.

If the product is not fully completed, but the activities for the day are done, the state 900 transitions to step 904 wherein a study planner day completion message is shown to the user. State 904 then continues to state 910 where the user's main study plan screen 84, including the right section 88, is shown to the user. As can be appreciated, this enables the user to get ahead of schedule, or practice an already completed activity.

If neither the product is done nor the day's scheduled activities are done, state 900 transitions to step 906 wherein an evaluation is performed to determine if the user is behind schedule. The user is considered behind schedule if any incomplete activities exist prior to the activities scheduled for the current day. If behind schedule, a behind schedule message is shown, such as represented in FIG. 5. State 906 then continues to state 910.

While in state 910, the user may navigate to the activities scheduled for any study plan day via the calendar 86. The user may also scroll through the day's scheduled activities, select an activity to work with, or re-execute the wizard 64 to recalculate the study plan.

As described above, the recommended activities for each session are initially based on a sequential walk through the content. Once the user recalculates a study plan, the study planner mechanism 82 chooses incomplete activities in a sequential order. To this end, the selection of the recommended activities is based on the number of sessions since the study plan was started. For example, if the study plan defines fifteen activities to be completed per session, then the first fifteen incomplete activities, in activity order, are planned (and displayed in a highlighted manner) for the first session, the next fifteen incomplete activity squares are planned for the next session, and so on. If the user falls behind, the next fifteen activities do not include activities scheduled for the previous session, i.e., the recommended activities advance without regard to user achievement. Similarly, if the user resets the study plan data, then the new recommended activities are recalculated (and displayed) in this manner.

As can be seen from the foregoing detailed description, there is provided a method and system that allows a user to quickly and easily create a personalized study plan. The user learns content via the study plan and the user's progress is tracked against the plan to provide notifications to the user thereby attempting to keep the user on schedule.

While the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computer system, a method comprising:
   providing a product having educational content, the educational content separated into a plurality of activities and having data associated therewith corresponding to an estimated time to complete the activities;
   receiving user input criteria comprising: data corresponding to a number of sessions, and one of two possible parameters including, a time per session, or a desired completion date;
   calculating a scheduled study plan for learning the activities, including:
   (a) when the parameter received comprises the time per session, automatically calculating a completion date based on the estimated time, the number of sessions data and the time per session, or
   (b) when the parameter received comprises the completion date, automatically calculating a time per session based on the estimated time, the number of sessions data and the completion date; and
   dynamically maintaining the scheduled study plan for the user, including:
   (a) tracking actual user progress with respect to learning the activities, including navigating to an activity to complete based on already completed activity data;
   (b) updating the already completed activity data to reflect user completion of each completed activity; and
   (c) providing status information to the user indicative of the actual progress of the user with respect to completing the activities.

2. The method of claim 1, further comprising, receiving user input indicative of a minimum skill level required for completing at least one activity.

3. The method of claim 1, wherein updating the already completed activity data includes maintaining an actual skill level achieved in association with each activity.

4. The method of claim 3, further comprising, receiving user input indicative of a minimum skill level required for completing at least one activity.

5. The method of claim 4, wherein user input changes the minimum skill level, and further comprising, comparing the actual skill level achieved for an activity with the minimum skill level required for completing that activity, and if the changed minimum skill level is not met by the actual skill level, updating the already completed activity data to reflect that the activity is not complete.

6. The method of claim 4, wherein user input changes the minimum skill level, and further comprising, comparing the actual skill level achieved for an activity with the minimum skill level required for completing that activity, and if the changed minimum skill level is met by the actual skill level, updating the already completed activity data to reflect that the activity is complete.

7. The method of claim 1, wherein providing status information to the user includes displaying progress information to the user.

8. The method of claim 1, wherein providing status information to the user includes displaying information to the user to indicate that the user is behind schedule in actual activities completed with respect to the scheduled study plan.

9. The method of claim 1, wherein the user is behind schedule in actual activities completed with respect to the scheduled study plan, and further comprising, recalculating a new completion date for the user based on the actual activities completed and an estimated time to complete activities that are not completed.

10. The method of claim 1, wherein the user is behind schedule in actual activities completed with respect to the scheduled study plan, and further comprising, recalculating a new time per session for the user based on the actual activities completed and an estimated time to complete activities that are not completed.

11. The method of claim 1, wherein the data corresponding to a number of sessions comprises information indicative of at least one study session per time frame.

12. The method of claim 11, wherein the information indicative of at least one study session per time frame includes data representing at least one day per week.

13. The method of claim 1, wherein the data corresponding to a number of sessions comprises information indicative of at least one session to exclude.

14. The method of claim 13 further comprising, receiving login information from the user, and retrieving the study plan for the user based on the login information.

15. The method of claim 1 dynamically maintaining the study plan comprises writing the study plan to a database in association with the user.

16. A computer-readable medium having computer executable instructions for performing the method of claim 1.

17. In a computer system, a system comprising:
 a product having educational content, the educational content separated into a plurality of activities and having data associated therewith corresponding to an estimated time to complete the activities;
 a user interface associated with the product, the user interface configured to receive user input criteria comprising data corresponding to a number of sessions, and one of two possible parameters including a time per session or a desired completion date;
 a study plan scheduler connected to the user interface to receive data therefrom, and configured to automatically calculate and store study plan schedule data for completing the activities, such that:
  (a) when the parameter received comprises the time per session, the scheduler automatically calculates a completion date based on the estimated time, the number of sessions data and the time per session, or
  (b) when the parameter received comprises the completion date, the scheduler automatically calculates a time per session based on the estimated time, the number of sessions data and the completion date; and
 a study plan mechanism that dynamically maintains the study plan schedule data for the user with respect to completion of activities by the user, the study plan mechanism configured to retrieve the study plan schedule data, compare already completed activity data against the schedule data to provide a selected activity for the user to complete, update the already completed activity data to reflect user completion of each activity, and provide status information to the user indicative of the actual progress of the user with respect to completing the activities.

18. The system of claim 17 wherein the user interface comprises a wizard that automatically steps the user through a plurality of display screens based on the user's input.

19. The system of claim 17 wherein the study plan scheduler stores the study plan schedule data in a database, and wherein the study plan mechanism retrieves the study plan schedule data from the database.

20. The system of claim 19 wherein the study plan mechanism maintains and updates the already completed activity data in the database.

21. The system of claim 17 further comprising a login process that receives login information from one of a plurality of users, and communicates user information corresponding to the login information to the study plan mechanism to, based on the user information, 1) retrieve the study plan schedule data and 2) retrieve the already completed activity data.

22. The system of claim 17 further comprising a mechanism for enabling the user to set a minimum completion level for at least one of the activities of the study plan.

23. The system of claim 17 wherein the study plan mechanism provides status information to the user via a progress tracker display that displays information corresponding to complete and incomplete activities.

24. A computer-readable medium associated with a product having educational content arranged as a plurality of activities to complete with estimated time data for completing the activities, the computer-readable medium having computer executable instructions, comprising:
 receiving user input criteria comprising: data corresponding to a number of sessions, and one of two possible parameters including, a time per session, or a desired completion date;
 calculating a study plan for learning the activities, including:
  (a) when the parameter received comprises the time per session, automatically calculating a completion date based on the estimated time, the number of sessions data and the time per session, or
  (b) when the parameter received comprises the completion date, automatically calculating a time per session based on the estimated time, the number of sessions data and the completion date; and
 storing the study plan calculated for the user;
 retrieving the study plan for the user;
 retrieving activity completion data for the user;
 providing an activity to complete based on the activity completion data;
 updating the activity completion data when the completes an activity; and
 recalculating the study plan based on the activity completion data relative to the plurality of activities to complete and the estimated time data for completing the activities.

25. The computer-readable medium of claim 24 wherein recalculating the study plan is performed in response to a request from the user.

26. The computer-readable medium of claim 24 having further computer executable instructions comprising, displaying progress information to the user based on the activity completion data.

27. The computer-readable medium of claim 24 having further computer executable instructions comprising, enabling the user to set a required completion level for at least one activity.

28. The computer-readable medium of claim 24 wherein the user modifies the completion level of at least one activity, and having further computer executable instructions comprising, updating the activity completion data based on the completion level modification.

29. The computer-readable medium of claim 24 wherein providing an activity to complete includes, receiving user input corresponding to a selected activity, and navigating to that activity in response to the user input.

* * * * *

UNITED STATES PATENT AND TRADEMARK OFFICE
CERTIFICATE OF CORRECTION

PATENT NO. : 6,353,447 B1
DATED : March 5, 2002
INVENTOR(S) : Truluck et al.

It is certified that error appears in the above-identified patent and that said Letters Patent is hereby corrected as shown below:

Column 5,
Lines 20-21, all numbers should not be in bold font as they do not reference diagrams.

Column 10,
Line 62, "the completes" should read -- the user completes --.

Signed and Sealed this

Twenty-third Day of November, 2004

JON W. DUDAS
*Director of the United States Patent and Trademark Office*